United States Patent [19]

Curran

[11] 4,193,295
[45] Mar. 18, 1980

[54] VISUAL TIRE VALVE

[76] Inventor: William F. Curran, 6561 Balfour, Allen Park, Mich. 48101

[21] Appl. No.: 2,915

[22] Filed: Jan. 12, 1979

[51] Int. Cl.² .............................................. B60C 23/02
[52] U.S. Cl. ................................... 73/146.8; 73/744; 116/34 R; 137/227
[58] Field of Search ............................. 73/146.8, 744; 116/34 R; 137/227, 228

[56] References Cited

U.S. PATENT DOCUMENTS

| | | | |
|---|---|---|---|
| 960,246 | 6/1910 | Ashmore | 116/34 R |
| 1,357,633 | 11/1920 | Getman | 137/227 |
| 1,473,171 | 11/1923 | Bowden | 73/146.8 |
| 1,548,470 | 9/1925 | Kennedy | 116/34 R |
| 1,686,165 | 10/1928 | Morse | 73/146.8 |
| 1,807,752 | 6/1931 | Poster | 73/146.8 |
| 2,479,915 | 9/1949 | Eastman | 116/34 R |
| 3,208,425 | 9/1965 | Jousma et al. | 116/34 R |
| 3,230,968 | 1/1966 | Struby | 137/227 |
| 3,260,233 | 7/1966 | Bergunder | 116/34 R |
| 3,886,563 | 6/1975 | Bluem | 346/155 |
| 3,889,530 | 6/1975 | Bluem | 73/146.8 |

Primary Examiner—Donald O. Woodiel
Attorney, Agent, or Firm—Cullen, Sloman, Cantor, Grauer, Scott & Rutherford

[57] ABSTRACT

A visual tire valve is adapted for mounting over a tire valve stem and includes a stem housing at one end mounted upon said valve stem, has an elongated bore intermediate its ends and an exteriorly threaded barrel at its other end having a counter bore. An axially apertured bolt is slidably nested within said bore and has three annular bands of different colors upon its exterior for indicating over inflation, proper inflation and under inflation with respect to a window in said stem housing. A second housing having an internally threaded bore is adjustably mounted upon and along said barrel and supports therein a stem having a normally closed longitudinal bore whose inner end extends into the second housing bore and partly into said counter bore and whose outer end projects from the second housing. A spring is interposed in compression between said bolt and stem. A normally seated spring-biased air flow control rod is disposed within said stem closing off air communication therethrough. A normally seated valve within said bolt is adapted to prevent passage of air therethrough in one direction. Once calibrated for a preset tire pressure, the visual tire valve automatically indicates the condition of air pressure within the tire.

16 Claims, 13 Drawing Figures

VISUAL TIRE VALVE

BACKGROUND OF THE INVENTION

Improper inflation of tires can decrease their life expectancy by as much as 50%. Some belted tires, for example, have such sensitive limitations that merely a few pounds of air pressure, plus or minus, can drastically shorten their life spans. Some tires, such as the steel belted ones, are extremely expensive, ranging in price from $60 to $90 apiece.

Under-inflated tires can usually be detected at a glance. However, modern belted tires are designed to maintain a recommended air pressure which make them appear to be somewhat flat. As a result, many motorists over-inflate them unwittingly, unaware that it has the same basic destroying effect as under-inflating.

Over-inflation is a real problem, because it's almost impossible to detect at a glance.

All tire manufacturers are emphatic when they guarantee a tire. Their guarantees are valid only if proper specified inflation recommendations are followed. In the Mercury-Monterey, for example, a permanent plaque on the inside of the glove box door recommends 26 lbs. of air in the front tires, 28 lbs. in the rear. In other words, even with four identical tires on one car, the manufacturer regards the two-pound differential from front and rear to be essential to the life and serviceability of the tires.

But it is, as we all know, a nuisance to check tires regularly. Most people do not carry an air gauge, and, though you may occasionally get your windshield cleaned, it is almost unheard of for a service station attendant to check your tires. It's an easily overlooked task by most of us; particularly, by women, understandably so.

Automobile owners' manuals and tire manufacturers have stated that improperly inflated tires can cause a loss of up to three or more miles per gallon of gasoline. This fact was considered rather insignificant when it was first realized years ago. Today, of course, the importance of stretching a gallon of gas cannot be over-emphasized.

Various types of pressure gauges have, heretofore, been attempted to provide instantaneous indications of the nature of tire pressure within a tire as being normal, over-inflated or under-inflated. Examples of such efforts are shown in one or more of the following Patents:

U.S. Pat. No. 1,473,171—Bowden
U.S. Pat. No. 2,479,915—Eastman
U.S. Pat. No. 1,548,470—Kennedy
U.S. Pat. No. 1,807,752—Poster
U.S. Pat. No. 3,889,530—Bluem
U.S. Pat. No. 1,686,165—Morse
U.S. Pat. No. 3,886,563—Bluem
U.S. Pat. No. 3,208,425—Jousma et al
U.S. Pat. No. 3,230,968—Struby
U.S. Pat. No. 3,260,233—Bergunder

SUMMARY OF THE INVENTION

It is an object of the present invention to provide a visual tire valve stem which shows graphically, through the use of three colors, when the tire is over-inflated (red), under-inflated (blue), or properly-inflated (yellow).

Once installed, this visual tire valve becomes an integral part of the tire.

It is a further object to eliminate the need for an air gauge after installation. The manufacturer's exact recommended pressure would be indicated when the visual tire valve shows full yellow. Any encroachment within the field of yellow by either red or blue would indicate improper inflation.

It is a further object to provide an axially apertured bolt which is movably mounted within the visual tire valve with respect to a window therein, and wherein a series of different color bands applied to said bolt will selectively show through said window, the air under pressure within the tire being, at all times, operating upon one end of said bolt with a spring yieldably bearing against its opposite end and wherein, the tension may be adjusted in calibrating the visual tire valve so that when the proper air pressure has been achieved within the tire, the yellow band will show fully through said windows. Such readings will remain constantly in view. In the case of a steel-belted tire, if it appears semi-flat, but the window shows the full yellow, it is properly inflated to the manufacturer's recommendation. If the steel-belted tire has been pumped up, losing its flat look but indicates red through said window, it is clearly over-inflated.

It is another object to provide an improved visual tire valve which, once assembled and calibrated with respect to a predetermined pressure set for a particular tire, provides an instantaneous visual indication at all times of the condition of the air pressure within said tire. The pressure of the air within the tire can be modified by adding air or removing air without disassembly of the present visual tire valve. At the same time, the addition of air or removal of air from the tire is by passage of said air directly through the present visual tire valve.

These and other objects will be seen from the following specification and claims in conjunction with the appended drawing.

THE DRAWING

It will be understood that the above drawing illustrates merely a preferred embodiment of the invention, and that other embodiments are contemplated within the scope of the claims hereafter set forth.

DETAILED DESCRIPTION OF THE INVENTION

Figure 1:
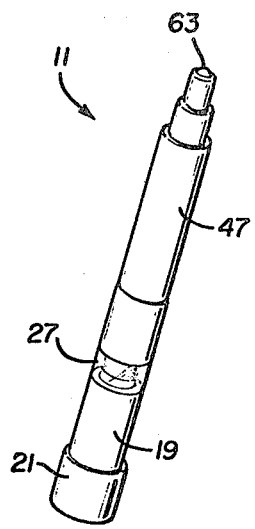
FIG. 1 is a full scale perspective view of the present visual tire valve.
Figure 2:
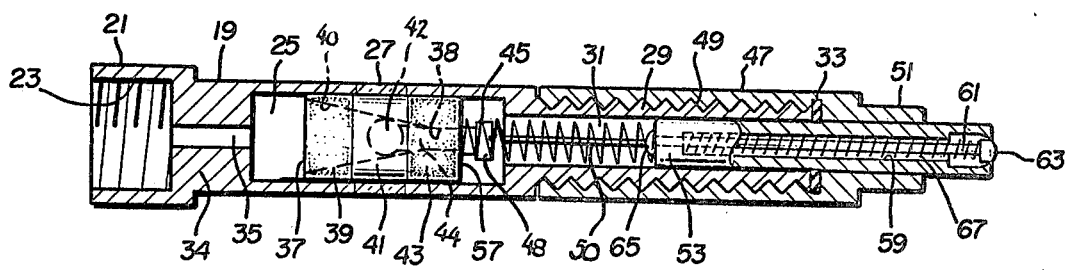
FIG. 2 is a longitudinal section thereof, on an increased scale.

The present visual tire valve is generally indicated at 11, FIG. 1, and on an increased scale, FIG. 2.

The present visual tire valve is adapted for threading onto the conventional threaded valve stem 13, fragmentarily shown in FIGS. 5-10, which projects from the conventional tire assembly.

Figure 10:
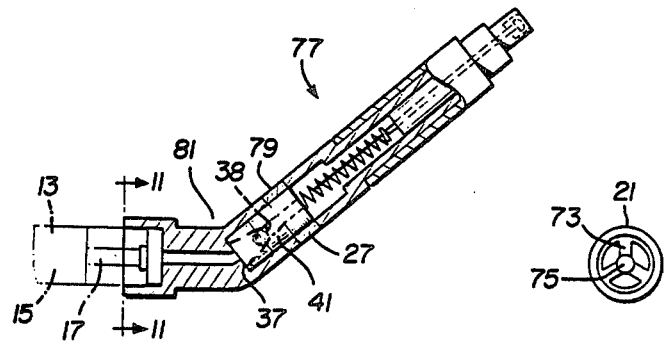
FIG. 10 is a longitudinal section of the present visual tire valve, with portions of the stem housing set at a relative obtuse angle to facilitate reading thereof.
Figure 11:
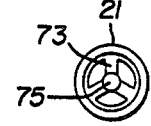
FIG. 11 is a section taken in the direction of arrows 11—11 of FIG. 10.

The conventional tire valve stem 13 has therein the normally seated valve element 15, FIG. 10, with the axial projecting stem 17. In use, upon inflating said tire, the conventional pressurized nozzle is normally applied over the end of the tire valve stem engaging and unseating the stem and associated valve element 15 to inflate the tire. As is conventional, upon application of a tire gauge to the valve stem 13, the movable element therein operatively engages the conventional stem 17 sufficient to unseat it and the associated valve element to obtain a pressure reading on the tire gauge.

The present visual tire valve 11 includes an elongated stem housing 19, preferably of a plastic material, having upon one end assembly collar 21 interiorly threaded at 23 adapted for threading over the conventional valve stem 13.

Stem housing 19, as shown in FIG. 2, inwardly of the collar 21, has a head 34 with a passage 35 therethrough, the elongated bore 25 and upon one end, the elongated barrel 29 which is exteriorly threaded and upon the interior thereof, counterbore 31 in communication with bore 25. The annular rubber seal 33 is applied over the outer end of barrel 29 and is adapted for cooperative sealing registry with second housing 47 when assembled over said barrel.

Figure 5:
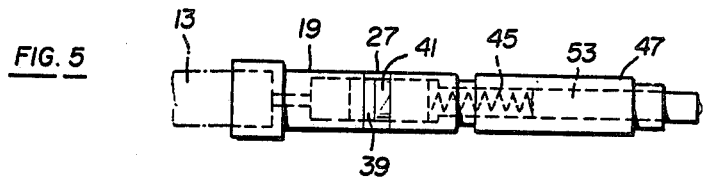
FIG. 5 is a side view of the present visual tire valve, uncalibrated.

Elongated cylindrical bolt 37, FIG. 5, having an axial aperture 38 at one end of circular cross section, is adjustably nested within bore 25 and has along the length thereof and applied thereto a plurality of different color bands 39, 41 and 43 of equal width corresponding to the width of the window 27 which is formed within stem housing 19. Aperture 38 terminates in tapered bore 40 which extends to the other end of said bolt. Ball valve 42 in use is normally seated within tapered bore 40, FIG. 2, and has a flat stem 44. Said stem extends through bore 38 with its top and bottom edges guidably positioned within slots 46 in said bolt. Stem 44 terminates in the transverse stop 48 which limits unseating movement of valve 42.

While it is contemplated that the laterally aligned color bands are constrastingly different colors for easy reading, in the illustrative embodiment, one outer band 39 has been colored for the color red to show over-inflation. The intermediate band 41 is colored yellow to show correct inflation and the outer band 43 is colored blue to show under inflation. Said visual tire valve is initially calibrated for the predetermined desired pressure within said tire and the tire has been so inflated. One or parts of a pair of said bands, FIGS. 3 and 4, will show through the window 27 for indicating pressure conditions within the tire to which the present visual tire valve has been applied.

Figure 12:
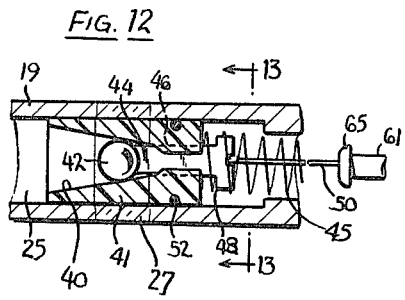
FIG. 12 is a fragmentary view of the bolt showing its normally seated valve, on an increased scale.
Figure 13:
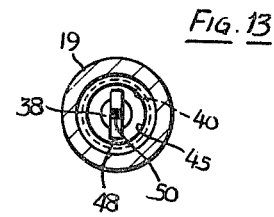
FIG. 13 is a section taken in the direction of arrows 13—13 of FIG. 12.

Loosely nested within counter bore 31 and a portion of the bore 25 is the coiled compression spring 45, which may be calibrated. Said spring at its inner end bears the outer end of the multiple color bolt 37 or may be secured thereto if desired. Said bolt has an exterior O-ring seal 52, FIG. 12.

Figure 3:
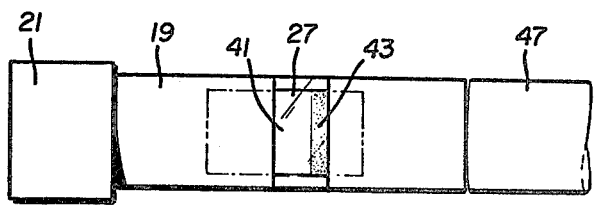
FIG. 3 is a fragmentary side view with a portion of the blue and yellow color bands showing through the window.
Figure 4:
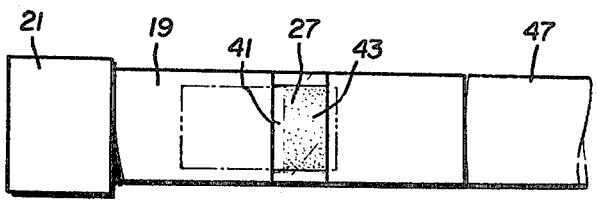
FIG. 4 is a similar view with an increased portion of the blue color band showing.

The second housing 47, preferably of a plastic material, of the same outside diameter as stem housing 19, as shown in FIG. 3, has an internal threaded bore 49 and at one end, the collar 51.

The elongated stem 53 has a longitudinal bore 59 therethrough, is snugly projected into housing 47 with a central portion of the stem frictionally or otherwise anchored within the collar 51 with an inner portion of said stem projected into the bore 31. The opposite end of said stem projects outwardly of the collar 51.

With the stem housing 19 having assembled therein the bolt 37 and the spring 45, the housing 47 is then threaded over the barrel 29 so that the inner end of the stem 53 projects into the counter bore 31 of the stem housing and is in operative engagement with spring 45. The inner end of the stem 53 is snugly, or at least, in frictional engagement with an adjacent portion of the barrel 29 as assembled.

So assembled, the multiple-color bolt 37 will be at the inner end of the bore 25 in engagement with head 34 and the color band 43 for the color blue will be in registry with the window 27. On this initial assembly, the spring 45 at its inner end will be seated as at 57 with respect to bolt 37.

The above stem 53 has a longitudinal bore 59 therethrough, within which is normally seated spring-biased air flow control rod 61. Enlarged heads 63 and 65 are upon the opposite ends of said rod and a suitable compression spring 67 is interposed between said rod and the bore of the stem normally maintaining said rod in such position, as to close off the air passage 59 through said stem.

Extension rod 50 at one end is adjustably threaded through head 65 and into rod 61 axially thereof, extends through spring 45 with its other end spaced from valve stem 44.

Collar 51 upon one end of the housing 47 is adapted for operative engagement with the conventional normally seated air valve within a high pressure nozzle by which compressed air may be applied to the tire through the present visual tire valve.

Figure 9:
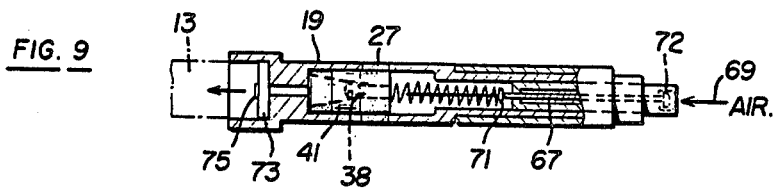
FIG. 9 is a longitudinal section of the present visual tire valve, indicating the application of air pressure from a nozzle for delivery therethrough and into the tire.

This is schematically shown in FIG. 9, and wherein, the arrow designates the application of high pressure air through such nozzle as at 69 which causes the respective heads 63 and 65 on the flow control rod to move to the unseated position shown at 71 and 72. This permits the passage of pressurized air at 69 through stem 53 through the respective housings 47 and 19 through the spring, through the apertured bolt 37 and through the apertured head 34 for direction through the conventional tire valve stem 13. Said pressurized air unseats ball valve 42.

The present visual tire valve mounted upon the tire valve stem 13 is capable of functioning whether or not the conventional normally seated valve element 15 is in said valve stem or not. In the event that the tire has been inflated to the predetermined selected correct pressure for the tire, and the conventional valve element 15 has been removed, the pressure upon the interior of the tire will act upon one end of the bolt 37 and ball valve 42 against the action of the spring 45.

Assuming, however, that the conventional valve element 15 is retained within the tire valve stem 13, then there is incorporated within the assembly collar 21 internally thereof the transverse apertured spider 73 having a central boss 75 adapted for registry with the valve element unseating said valve elements as the visual tire valve is assembled.

The tapered bore 40 within the bolt is sealed closed by ball valve 42 so that essentially the primary pressure within the tire will be applied to the end face of bolt 37 and said ball valve.

OPERATION

Referring to FIG. 5, assuming that the tire involved is designed for use at 32 lbs. per square inch, air pressure, when the present visual tire valve is assembled over the stem 13, the pressure applied to the tri-color bolt 37 will normally move said bolt, FIG. 5, so that the red color band 39 will show through the window 27. Since it is known that the tire has the correct air pressure therein as preset, the visual tire valve is now calibrated by manually rotating the second housing 47 in a clockwise direction as shown by the arrow, FIG. 6, increasing the compression within the spring 45, moving the bolt inwardly until the yellow color band 41 is in full registry with window 27. It is this adjustment of the housing 47 which causes inward movement of the housing 47, the stem 53 mounted thereon, the spring and the bolt to move as a unit until the pressure of compression in the spring is exactly counter-balancing the pressure from the tire so that the yellow color band is in full registry through the window 27.

Figure 7:
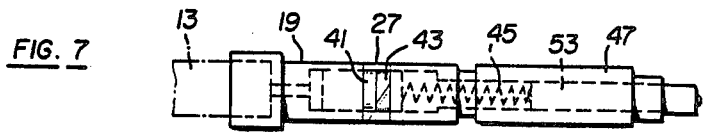
FIG. 7 is a view similar to FIG. 5 before the visual tire valve has been calibrated to a predetermined lower pressure.

Assuming, on the other hand, that the predetermined correct pressure for a steel belted tire involved is 24 lbs. per square inch, once the tire has been so inflated and the visual tire valve assembled thereover, as in FIG. 7, normally the blue band 43 will be in registry with window 27. In this extreme inward position, the tri-color bolt is adjacent the head 34, forming a part of the stem housing 19.

Figure 8:
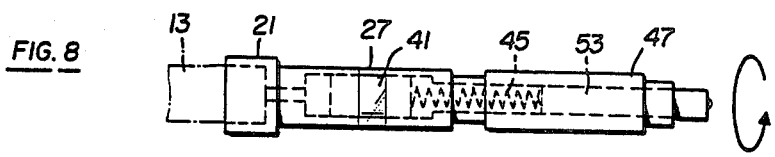
FIG. 8 is a view similar to FIG. 7 with the second housing rotated in a counter-clockwise direction in order to calibrate the visual tire valve to said reduced pressure.

Since it is known that the tire now has the correct pressure therein, the outer housing 47 is rotated in a counter-clockwise direction, reducing the compression within the spring 45 sufficiently until the pressure within the tire causes movement of the tri-color bolt to the centralized position, FIG. 8, with the yellow band 41 showing through window 27. Thus, in FIG. 8, the visual tire valve 11 has been calibrated for the above described low pressure of 24 lbs. per square inch.

Figure 6:
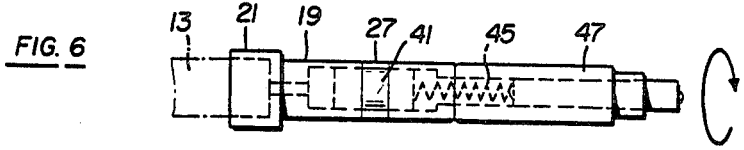
FIG. 6 is a similar view showing the second housing as rotatably adjusted in a clockwise direction for calibrating the visual tire valve to a predetermined tire pressure with the yellow band showing through the window.

Accordingly, now in either of the situations above described with respect to FIGS. 6 and 8, should there, thereafter, be a loss or increase of air pressure within the connected tire, the respective bolt will have responded to such change in pressure and will move so that only part of the central yellow band will show along with part of the adjacent red color band as in FIG. 5, to show over inflation, or with a portion of the blue color band 43 showing as in FIG. 3 to show under inflation. In the extreme positions of over-inflation or under-inflation, a single color band will show through the window 27 thereby designating an incorrect tire pressure either above or below the prescribed pressure for that tire.

If the tire happens to be over-inflated, manual inward projection of the flow control rod 61 within the stem bore 59 unseats the heads 63 and 65 such as to the unseated position 71-72, shown in FIG. 9, and rod 50 unseats ball valve 42 to permit escape of excess air from the tire through the visual tire valve and out through the stem 53 until the central color band 41 is in registry with window 27, FIG. 6. Alternately, if color designation blue shows in whole or part in the window, FIGS. 3-4, the application of high pressure air at 69, FIG. 9, additionally causes unseating of the flow control rod 61 against its spring 67 and unseating of ball valve 42, such that air under pressure will flow directly through the visual tire valve through the respective housings 47 and 19 through the spring, through the stem, through the bolt and directly into the conventional valve stem of the tire until, again, the central color band 41 marked yellow for illustration is in full registry with window 27.

The outer portion of the threads of barrel 29 are preferably cross threaded, serving as a stop to prevent accidental removal or movement of the second housing 47 from said barrel.

A slight modification of the present visual tire valve is designated at 77 in FIG. 10. Here the only change is that a portion of the stem housing 79 has been bent at an obtuse angle 81 so as to facilitate reading of the visual tire valve. Thus, the reading portion of the visual tire valve, instead of being radially extending as it would normally be if attached to the tire valve stem, will extend outwardly sufficiently to faciliate reading and at the same time, will fore-shorten its protrusion safely below the critical level where it can be protected by the wheel rim against curb damage.

The structure, function and operation of the visual tire valve 77 is exactly the same as above described.

Having described my invention, reference should now be had to the following claims.

I claim:

1. A visual tire valve adapted for mounting over a tire valve stem comprising a stem housing having an internally threaded collar at one end mounted upon said valve stem; an elongated bore intermediate said housing ends, and an externally threaded barrel at the other end of said housing having a counter bore communicating with said bore;

the stem housing including an apertured head between said collar and bore;

a cylindrical bolt slidably mounted in said bore having an axial aperture at one end terminating in a tapered bore;

a ball valve normally seated on said tapered bore having a stem projected loosely through said bolt aperture and outwardly thereof;

there being three annular bands of different colors end-to-end over the exterior of said bolt, for indicating over inflation, proper inflation, and under inflation, respectively;

a transparent window in said stem housing of the same width as one color band, for viewing one band and alternately, parts of adjacent bands indicating selectively the tire pressure; i.e., proper inflation, partly under or over inflation;

a second housing having an internally threaded bore adjustably mounted upon and along said barrel;

a stem having a normally closed longitudinal bore axially mounted and secured intermediate its ends upon one end of said second housing with its inner end extending into the second housing bore and said counter bore and its other end projecting from said second housing;

a calibrated spring within said second housing and stem housing interposed in compression between said bolt and stem;

and a normally seated spring biased air flow control rod within said latter stem having enlarged heads at its opposite ends closing off air communication through said stem and upon application thereto of air pressure for inflation of said tire adapted to unseat for transmitting compressed air through said stem and housings, unseating said ball valve, and through said tire valve stem until an intermediate color registers with said window.

2. In the visual tire valve of claim 1, said ball valve stem terminating in a stop outwardly of said bolt;

an extension rod at one end adjustably threaded into said air flow control rod axially thereof with its other end normally spaced from said ball valve stop;

said flow control rod on over inflation adapted for manual unseating, said extension rod unseating said ball valve to permit the escape of excess pressurized air from the tire and through said housings and control rod until the intermediate color band registers with said window.

3. In the visual tire valve of claim 1, said visual tire valve being calibrated for the predetermined proper inflation with the intermediate color band registering with said window, any subsequent movement of said bolt and corresponding color bands due to a change in said inflation providing a visual indication at said window of the over or under inflation.

4. In the visual tire valve of claim 1, a normally seated tire valve within said valve stem;

and an apertured web within said collar adapted on assembly of the stem housing over said valve stem to unseat said tire valve, for applying the air pressure of said tire to one end of said bolt.

5. A visual tire valve adapted for mounting over a tire valve stem comprising a stem housing at one end mounted upon said valve stem, having an elongated bore intermediate said housing ends and an exteriorly threaded barrel at the other end of said housing having a counter bore communicating with said bore;

a bolt slidably mounted within said bore having an axial aperture at one end terminating in a tapered bore;

a ball valve normally seated in said tapered bore having a stem projected loosely through said bore aperture and outwardly thereof;

there being three annular bands of different colors end-to-end over the exterior of said bolt, for indicating over inflation, proper inflation, and under inflation, respectively;

a transparent window in said stem housing of the same width as one color band, for viewing one band and alternately, parts of a pair of adjacent bands;

a second housing having an internally threaded bore adjustably mounted upon and along said barrel;

a stem having a normally closed longitudinal bore axially mounted and secured intermediate its ends upon one end of said second housing with its inner end extending into the second housing bore and partly into said counter bore, and its other end projecting from said second housing;

a spring within said second housing and stem housing interposed in compression between said bolt and stem;

and a normally seated spring-biased air flow control rod within said latter stem closing off air communication through said stem, and upon application thereto of air under pressure adapted to unseat for transmitting compressed air through said stem and housing, unseating said ball valve, and through said tire valve stem, until an intermediate color band registers with said window.

6. In the visual tire valve of claim 5, said stem housing and second housing being of uniform outside diameter.

7. In the visual tire valve of claim 5, the end of said latter stem projecting from said second housing adapted for unseating engagement with a normally seated air pressure valve of a source of air under pressure, said air flow control rod unseating for the passage of compressed air through said stem, and housings and into said tire.

8. In the visual tire valve of claim 5, a normally seated tire valve within said valve stem;

and an apertured web within said stem housing adapted upon assembly of the stem housing over said valve stem to unseat said tire valve, for applying the air pressure of said tire to one end of said bolt.

9. In the visual tire valve of claim 5, rotation of the second housing in one direction relative to said stem housing increasing the compression of said spring, and rotation in the opposite direction decreasing the compression of said spring, whereby once a predetermined pressure of air is provided within said tire, rotation of said housing causes said intermediate color band to register with said window, thereby calibrating the visual tire valve for said predetermined pressure.

10. In the visual tire valve of claim 5, said flow control rod having normally seated enlarged valve heads at its opposite ends, inward unseating movement of said rod permitting the passage of air through said stem.

11. In the visual tire valve of claim 5, said stem housing having an obtuse angularly bend intermediate its ends for prelocating the projecting end of said stem and stem housing to facilitate reading.

12. In the visual tire valve of claim 5, said color bands being of uniform width, corresponding to the width of said window, said bands being red, yellow and blue to respectively indicate through said window over inflation, proper inflation and under inflation.

13. In the visual tire valve of claim 5, a rubber sealing ring mounted on one end of the stem housing and adapted for sealing registry with said second housing.

14. In the visual tire valve of claim 5, the outer portion of the threads of said barrel being cross threaded, serving as a stop to prevent accidental removal of said second housing from said barrel.

15. In the visual tire valve of claim 5, said bolt being three-fifths of the length of said stem housing bore, said window being central of said bore so that with the visual tire valve calibrated to the pre-selected tire pressure, the central color band registers with said window, with maximum movement of said bolt in either direction not exceeding the width of any color band.

16. A visual tire valve adapted for mounting over a tire stem comprising a stem housing at one end mounted upon said valve stem, having an elongated bore intermediate said housing ends and a barrel at the other end of said housing having a counter bore communicating with said bore;

a bolt slidably mounted within said bore having an axial aperture at one end terminating in a tapered bore;

a ball valve normally seated in said tapered bore having a stem projected loosely through said bolt aperture and outwardly thereof;

there being three annular bands of different colors end-to-end over the exterior of said bolt, for indicating over inflation, proper inflation, and under inflation, respectively;

a transparent window in said stem housing of the same width as one color band, for viewing one band and alternately, parts of a pair of adjacent bands;

a second housing having a bore adjustably mounted upon and along said barrel;

a stem having a normally closed longitudinal bore axially mounted and secured intermediate its ends upon one end of said second housing with its inner end extending into the second housing bore and partly into said counter bore, and its other end projecting from said second housing;

a spring within said second housing and stem housing interposed in compression between said bolt and stem;

and a normally seated spring-biased air flow control rod within said latter stem closing off air communication through said stem, and upon application thereto of air under pressure adapted to unseat for transmitting compressed air through said stem and housings, unseating said ball valve, and through said tire valve stem, until an intermediate color band registers with said window.

* * * * *